United States Patent
Watanabe et al.

(10) Patent No.: US 10,440,264 B2
(45) Date of Patent: Oct. 8, 2019

(54) IMAGE PROCESSING SYSTEM, METHOD OF RECONFIGURING FIELD PROGRAMMABLE GATE ARRAY, INFORMATION PROCESSING DEVICE, INFORMATION PROCESSING METHOD, AND NON-TRANSITORY COMPUTER-READABLE MEDIUM

(71) Applicant: OMRON Corporation, Kyoto (JP)

(72) Inventors: Kosuke Watanabe, Kusatsu (JP); Toshinori Tamai, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/844,636

(22) Filed: Dec. 18, 2017

(65) Prior Publication Data
US 2018/0262679 A1    Sep. 13, 2018

(30) Foreign Application Priority Data
Mar. 10, 2017  (JP) ................................. 2017-045976

(51) Int. Cl.
*H04N 5/232* (2006.01)
*G06F 12/06* (2006.01)
*H04N 1/00* (2006.01)

(52) U.S. Cl.
CPC ......... *H04N 5/23225* (2013.01); *G06F 12/06* (2013.01); *H04N 1/00344* (2013.01);
(Continued)

(58) Field of Classification Search
CPC ........... H04N 5/23225; H04N 5/23216; H04N 1/00344; G06F 12/06; G06F 2212/172; G06F 2212/1041; G06F 3/04842; G06F 3/0482; G05B 19/402; G05B 2219/31081; G06T 7/73; G06T 7/0004; G06T 1/20;
(Continued)

(56) References Cited

U.S. PATENT DOCUMENTS 9,697,579 B2 *   7/2017   Taggart ................. G06T 15/005
10,223,192 B2 *  3/2019   Goodman ............. G06F 11/079
(Continued)

FOREIGN PATENT DOCUMENTS

JP          2014203309          10/2014

*Primary Examiner* — Pritham D Prabhakher
(74) *Attorney, Agent, or Firm* — JCIPRNET

(57) ABSTRACT

An image processing system can specify storage locations of necessary functions even when a user-set process flow has been updated. The image processing system includes a setting device and an image processing device. The image processing device includes a storage device and a field programmable gate array (FPGA). The setting device includes a generation part that generates storage location information defining a storage location in the storage part for each of image processing programs to be selected, which have been selected from a library, and a transmission part that transmits the image processing programs to be selected, a process flow defining an execution order of the image processing programs, and the storage location information to the image processing device. The image processing device includes a rewriting part that writes a received image processing program to a storage location of the storage device defined in the storage location information.

19 Claims, 13 Drawing Sheets

(52) U.S. Cl.
CPC . *H04N 5/23216* (2013.01); *G06F 2212/1041* (2013.01); *G06F 2212/172* (2013.01)

(58) Field of Classification Search
CPC . G06T 2207/10012; G06T 2207/30164; Y10S 901/01; G06K 9/00993; G06K 9/00973; G06K 9/2081; G06K 9/6253; G06K 2209/01; G06K 2209/19; G06K 2209/21
USPC .................................................. 348/207.11
See application file for complete search history.

(56) References Cited

U.S. PATENT DOCUMENTS

| | | | |
|---|---|---|---|
| 2014/0304637 A1* | 10/2014 | Ijiri ..................... | G06F 3/04842 715/771 |
| 2014/0368516 A1* | 12/2014 | Taggart ................. | G06T 15/005 345/505 |
| 2018/0107411 A1* | 4/2018 | Goodman ........... | G06F 11/1471 |
| 2018/0107562 A1* | 4/2018 | Goodman ........... | G06F 11/1451 |
| 2018/0107999 A1* | 4/2018 | Rizzolo ............ | G06K 19/06028 |
| 2018/0108120 A1* | 4/2018 | Venable .................. | G01S 17/88 |
| 2018/0225306 A1* | 8/2018 | He .......................... | G10L 15/26 |

* cited by examiner

| No | FUNCTION MODULE FOR CPU | FUNCTION MODULE FOR FPGA |
|---|---|---|
| 0×01 | IMAGE PROCESSING PROGRAM 1 | IMAGE PROCESSING PROGRAM 1 |
| 0×02 | IMAGE PROCESSING PROGRAM 2 | IMAGE PROCESSING PROGRAM 2 |
| ⋮ | ⋮ | ⋮ |
| 0×nn | IMAGE PROCESSING PROGRAM n | IMAGE PROCESSING PROGRAM n |

FIG. 7

| No | ITEMS | EXECUTING ENTITY |
|---|---|---|
| 1 | WEAK SMOOTHING | FPGA |
| 2 | STRONG SMOOTHING | FPGA |
| ⋮ | ⋮ | |
| n | HDR SYNTHESIS | CPU |

| FPGA | | 111 | 135 | |
|---|---|---|---|---|
| No | ITEMS | | EXECUTION CHECK | EXECUTION ORDER |
| 1 | EXPANSION | | ✓ | 1 |
| 2 | CONTRACTION | | ✓ | 2 |
| 3 | TRAPEZOIDAL CORRECTION | | ☐ | — |
| ... | ... | | ... | ... |

| CPU | | 111 | 135 | |
|---|---|---|---|---|
| No | ITEMS | | EXECUTION CHECK | EXECUTION ORDER |
| 1 | EXPANSION | | ☐ | — |
| 2 | CONTRACTION | | ☐ | — |
| 3 | TRAPEZOIDAL CORRECTION | | ✓ | 3 |
| ... | ... | | ... | ... |

140A(105)

OK — 118
CANCEL — 119

IMAGE PROCESSING SYSTEM, METHOD OF RECONFIGURING FIELD PROGRAMMABLE GATE ARRAY, INFORMATION PROCESSING DEVICE, INFORMATION PROCESSING METHOD, AND NON-TRANSITORY COMPUTER-READABLE MEDIUM

CROSS-REFERENCE TO RELATED APPLICATION

This application claims the priority of Japan patent application serial no. 2017-045976, filed on Mar. 10, 2017. The entirety of the above-mentioned patent application is hereby incorporated by reference herein and made a part of this specification.

BACKGROUND

Technical Field

The disclosure relates to a technology for reconfiguring a circuit configuration of a field programmable gate array (FPGA).

Description of Related Art

Techniques for automatically inspecting workpieces have become widespread in the factory automation (FA) field. A process of inspecting workpieces is realized by a combination of various image processes. Applications that provide a user interface to allow a user to set such a combination of image processes have been developed.

With respect to such applications, Japanese Patent Application Publication Laid-Open (JP-A) No. 2014-203309 discloses an image processing device which can realize more efficient and high-speed image processing by utilizing the user's knowledge about specific application image processing. According to said Patent Publication, the user selects desired process items from a plurality of process items in which different image processes are defined, arranges the process items side by side on the user interface, and executes each of the process items in an execution order according to the order in which the process items are arranged. The user can realize an arbitrary inspection process by changing the combination of process items. Hereinafter, a series of grouped image processes realized by the process items combined by a user is also referred to as a "user-set process flow."

The user-set process flow is executed, for example, by an image processing device such as a visual sensor. Some FPGAs installed in the image processing device have a function of dynamically reconfiguring their circuit configuration during execution of a process (a so-called partial reconfiguration (PR) function). When such an FPGA is used, the image processing device appropriately reconfigures the circuit configuration of the FPGA in the course of executing the user-set process flow.

Various image processing programs for reconfiguring the circuit configuration of the FPGA are provided, for example, from an information processing device such as a server. Since the memory capacity of the image processing device is generally not so great, it is not practical to preinstall all image processing programs that can be provided from the information processing device in the image processing device. Therefore, only image processing programs necessary to realize the user-set process flow are installed from the information processing device.

When the user-set process flow has been updated, the image processing device needs to newly install therein necessary image processing programs from the information processing device. Here, when the storage locations of the image processing programs in the image processing device have been rewritten, the image processing device cannot specify where the necessary functions are stored. Therefore, there is a demand for a technology which can specify the storage locations of required functions even when the user-set process flow has been updated

SUMMARY

According to an aspect, an image processing system includes an image processing device and an information processing device configured to be communicable with the image processing device. The image processing device includes a first storage part and a field programmable gate array (FPGA) configured to be able to reconfigure an internal circuit configuration. The information processing device includes a second storage part configured to store a library including a plurality of image processing programs that are executable by the FPGA, a setting part configured to provide a user interface configured to be able to receive a selection manipulation for selecting one or more image processing programs from the library and a designation manipulation for designating an execution order of the image processing programs to be selected by the selection manipulation, a generation part configured to generate storage location information defining a storage location in the first storage part for each of the image processing programs to be selected, and a transmission part configured to transmit the image processing programs to be selected, a process flow defining the execution order of the image processing programs, and the storage location information to the image processing device. The image processing device further includes a rewriting part configured to write each of the image processing programs received from the information processing device to a storage location of the first storage part defined in the storage location information and a reconfiguration part configured to sequentially read each of the image processing programs from the storage location of the first storage part defined in the storage location information according to the execution order defined in the process flow on the basis of receipt of an instruction to execute the process flow and to reconfigure the circuit configuration of the FPGA according to the read image processing program.

According to another aspect, a method of reconfiguring a circuit of an FPGA provided in an image processing device includes preparing a library including a plurality of image processing programs that are executable by the FPGA, providing a user interface configured to be able to receive a selection manipulation for selecting one or more image processing programs from the library and a designation manipulation for designating an execution order of the image processing programs to be selected by the selection manipulation, generating storage location information defining a storage location in a storage part of the image processing device for each of the image processing programs to be selected, transmitting the image processing programs to be selected, a process flow defining the execution order of the image processing programs, and the storage location information to the image processing device, writing each of the image processing programs to a storage location of the storage part defined in the storage location information in the image processing device, and sequentially reading, in the image processing device, each of the image processing programs from the storage location of the storage part defined in the storage location information according to the execution order defined in the process flow and reconfiguring a circuit configuration of the FPGA according to the read image processing program.

According to another aspect, an information processing device configured to be communicable with an image processing device including a first storage part and an FPGA includes a second storage part configured to store a library including a plurality of image processing programs that are executable by the FPGA, a setting part configured to provide a user interface configured to be able to receive a selection manipulation for selecting one or more image processing programs from the library and a designation manipulation for designating an execution order of the image processing programs to be selected by the selection manipulation, a generation part configured to generate storage location information defining a storage location in the first storage part for each of the image processing programs to be selected, and a transmission part configured to transmit the image processing programs to be selected, a process flow defining the execution order of the image processing programs, and the storage location information to the image processing device.

According to another aspect, an information processing method for an information processing device configured to be communicable with an image processing device including a first storage part and an FPGA includes preparing a library including a plurality of image processing programs that are executable by the FPGA, providing a user interface configured to be able to receive a selection manipulation for selecting one or more image processing programs from the library and a designation manipulation for designating an execution order of the image processing programs to be selected by the selection manipulation, generating storage location information defining a storage location in the first storage part for each of the image processing programs to be selected, and transmitting the image processing programs to be selected, a process flow defining the execution order of the image processing programs, and the storage location information to the image processing device.

According to another aspect, a non-transitory computer-readable medium storing an information processing program that is executed by an information processing device configured to be communicable with an image processing device including a first storage part and an FPGA causes the information processing device to perform preparing a library including a plurality of image processing programs that are executable by the FPGA, providing a user interface configured to be able to receive a selection manipulation for selecting one or more image processing programs from the library and a designation manipulation for designating an execution order of the image processing programs to be selected by the selection manipulation, generating storage location information defining a storage location in the first storage part for each of the image processing programs to be selected, and transmitting the image processing programs to be selected, a process flow defining the execution order of the image processing programs, and the storage location information to the image processing device.

The above and other objects, features, aspects and advantages provided in one or more embodiments in the disclosure will become apparent from the following detailed description of the disclosure taken in conjunction with the accompanying drawings.

BRIEF DESCRIPTION OF THE DRAWINGS

FIG. 7 is a diagram showing an exemplary data structure of a library.

FIG. 8 is a diagram showing a user interface provided by the setting part.

FIG. 9 is a diagram showing a modification of the user interface.

DESCRIPTION OF THE EMBODIMENTS

Figure 1:
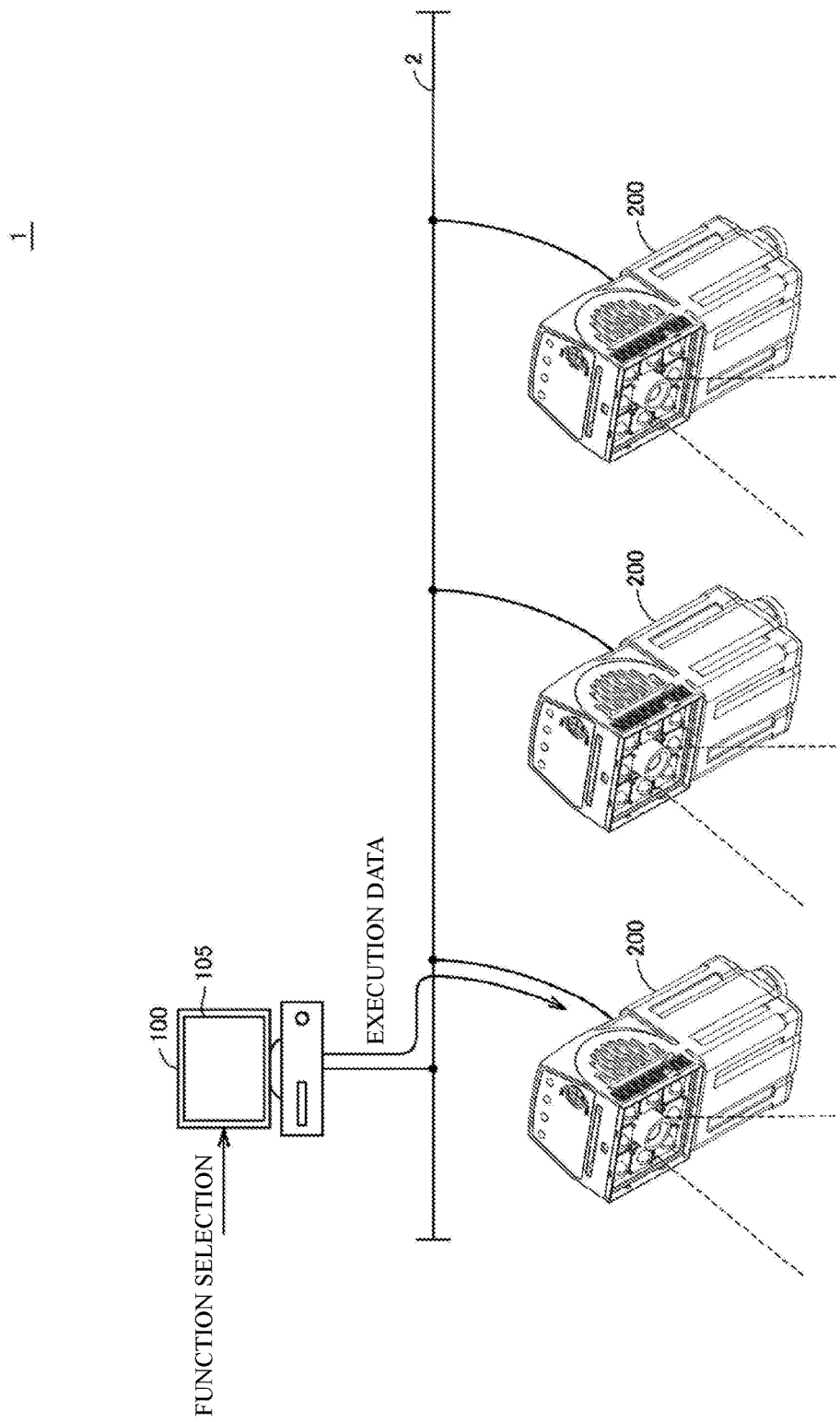
FIG. 1 is a diagram showing an exemplary system configuration of an image processing system according to an embodiment.

In an embodiment of the invention, a capacity of the first storage part in the image processing device is smaller than a capacity of the second storage part in the image processing device.

In an embodiment of the invention, the storage location information defines both a start address and a data size of each of the image processing programs to be selected as the storage location, both the start address and the data size indicating a storage destination of each of the image processing programs to be selected in the first storage part.

In an embodiment of the invention, the user interface is configured to be able to receive an addition manipulation for adding a new image processing program to the image processing programs to be selected. The generation part is configured to add a storage destination of the new image processing program in the first storage part to the storage location information on the basis of receipt of the addition manipulation by the user interface.

In an embodiment of the invention, the user interface is configured to be able to receive a deletion manipulation for deleting a specific image processing program from the image processing programs to be selected. The generation part is configured to delete a storage location of an image processing program designated by the deletion manipulation from storage locations defined in the storage location information on the basis of receipt of the deletion manipulation by the user interface.

In any of the aspects, the storage locations of necessary functions can be specified even when the user-set process flow is updated.

Hereinafter, embodiments of the invention will be described with reference to the drawings. In the following description, the same components or constituent elements are denoted by the same reference numerals. Their names and functions are the same. Therefore, their detailed descriptions will not be repeated. Embodiments and modifications described below may be selectively combined as appropriate.

A. [Overview]

Figure 2:
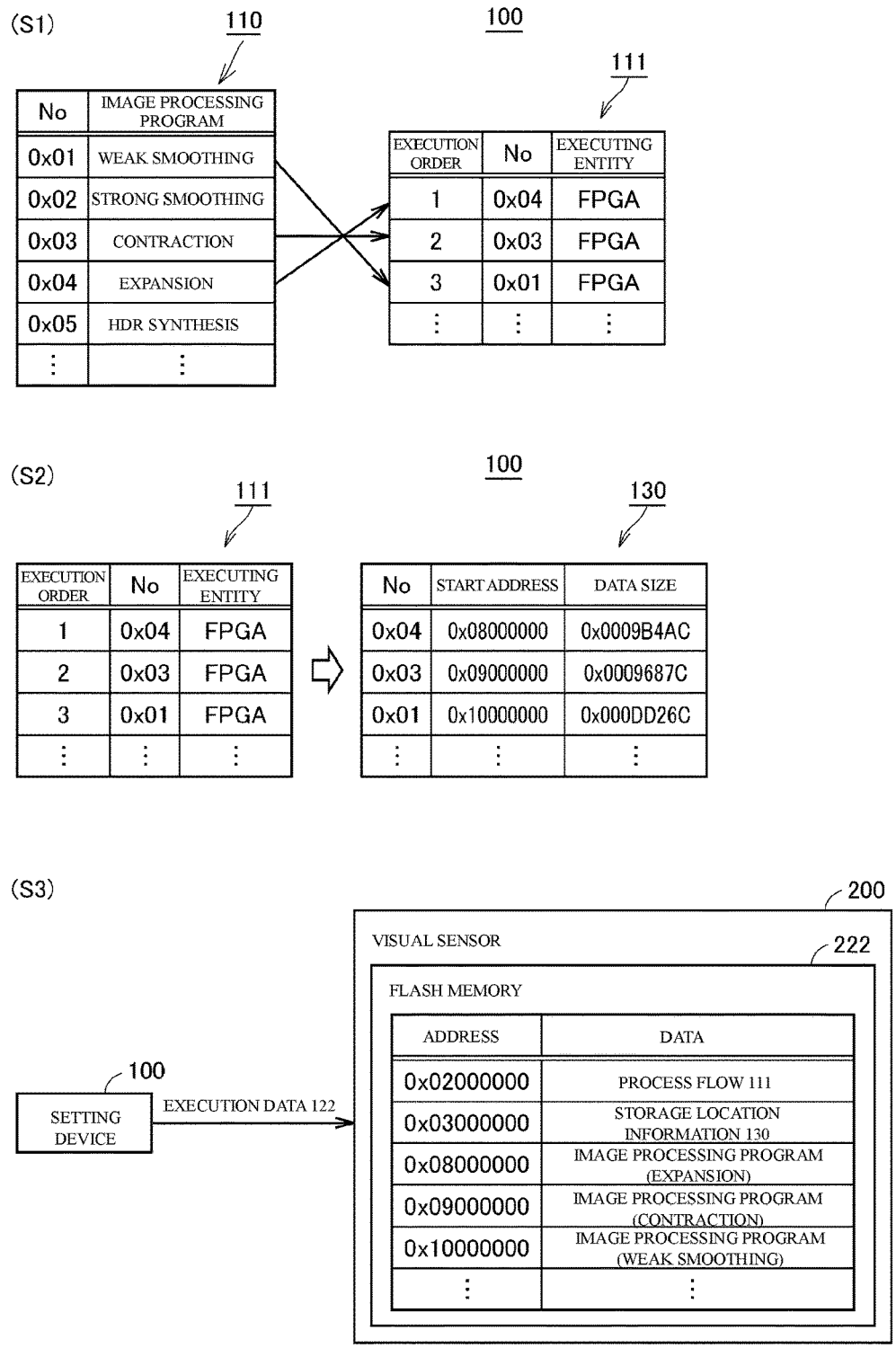
FIG. 2 is a conceptual diagram showing a procedure of setting a process flow in chronological order.
Figure 3:
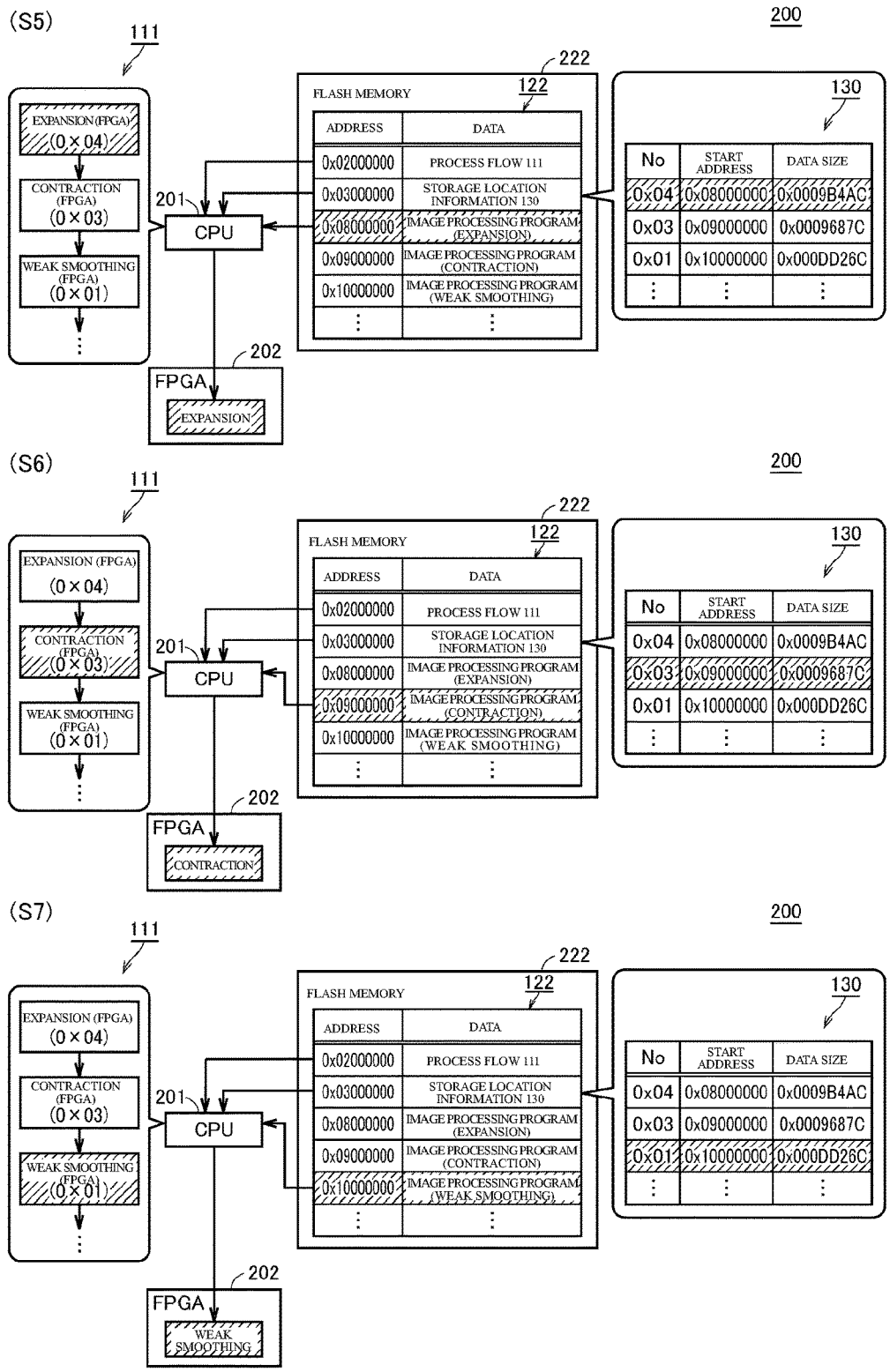
FIG. 3 is a conceptual diagram showing a measurement process performed by an image processing device according to the embodiment in chronological order.

An overview of the image processing system 1 according to the present embodiment will be described with reference to FIGS. 1 to 3. FIG. 1 is a diagram showing an exemplary system configuration of an image processing system 1 according to the present embodiment. The image processing system 1 is typically assembled in a production line or the like. The image processing system 1 performs processing such as character recognition and scratch inspection (hereinafter also referred to as a "measurement process") on the basis of an image obtained by imaging a workpiece to be inspected which is conveyed on the production line.

In the example shown in FIG. 1, the image processing system 1 includes a setting device 100, which is an example of an information processing device, and one or more image processing devices 200 configured to be communicable with the setting device 100.

The setting device 100 and the image processing devices 200 are connected to a network 2. For example, the workpiece is conveyed in a predetermined direction by a conveyance mechanism such as a belt conveyor and each of the image processing devices 200 is arranged at a predetermined position relative to the conveyance path.

The image processing device 200 is, for example, an image sensor having an imaging function. More specifically, the image processing device 200 includes an imaging part, a storage device that stores a library including a plurality of function modules for realizing image processing functions, and a processing part that executes at least one function module (typically, at least one program module) to process an image obtained from the imaging part. Each of the function modules includes an instruction code, an execution module, or the like for realizing some image processing function(s) in the image processing device 200. By arbitrarily combining image processes included in the library, the user can set various process flows in the image processing device 200 and can realize arbitrary measurement processes.

In this manner, the user sets a process flow prior to the measurement process. In the following, a procedure of setting a process flow and a measurement process realized by executing the process flow will be described sequentially.

(A1. Setting Process)

A procedure of setting a process flow designed by the user in the image processing device will now be described with reference to FIG. 2. FIG. 2 is a conceptual diagram showing the procedure of setting the process flow in chronological order.

In step S1, a library including a plurality of image processes is displayed in a list on a display part of the setting device 100. By manipulating a manipulation part such as a keyboard or a mouse, the user can perform a manipulation for selecting one or more image processes from the library 110 and a manipulation for designating the execution order of the image processes to be selected, which have been selected through the manipulation. These manipulations are repeated to design an arbitrary process flow. For example, the execution order of image processes is specified by the arrangement order of the image processes to be selected. In the example of FIG. 2, a process flow 111 is designed by an image process group selected from the library 110.

In an embodiment of the invention, the setting device 100 is configured to be able to designate an executing entity in the image processing device 200 for each image process included in the process flow 111. As an example, the image processing device 200 has a CPU and an FPGA and the user can designate one of the CPU and the FPGA as the executing entity. Thus, in the measurement process which will be described later, each image process included in the process flow 111 is executed by the designated executing entity. Typically, an FPGA having a function of dynamically reconfiguring its circuit configuration during execution of a user-set process flow (a so-called partial reconfiguration (PR) function) is adopted as the FPGA of the image processing device 200. The circuit scale of the FPGA is virtually expanded by appropriately reconfiguring the circuit configuration.

In step S2, the setting device 100 generates storage location information 130 on the basis of the user-set process flow 111. Identification information of each image process included in the process flow 111 and a storage destination of an image processing program for realizing the image process are associated with each other in the storage location information 130. The storage destination of the image processing program is represented, for example, by a start address in a storage device 222 in the image processing device 200 and the data size of the image processing program.

The storage destination of the image processing program may also be represented by other information. As an example, the storage destination of the image processing program may be represented by a start address and an end address. Alternatively, the storage destination of the image processing program may be represented by the end address and the data size.

In step S3, the setting device 100 transmits the user-set process flow 111, the storage location information 130, and each image processing program for realizing the process flow 111 to the image processing device 200 as execution data 122. Typically, the image processing program is reconfiguration data for reconfiguring the circuit configuration of the FPGA 202 of the image processing device 200. The image processing device 200 writes each image processing program received from the setting device 100 to a storage location defined in the storage location information 130. The image processing device 200 also writes the user-set process flow 111 and the storage location information 130 to the storage device 222.

(A2. Measurement Process)

Next, a measurement process realized by the user-set process flow 111 will be described with reference to FIG. 3. FIG. 3 is a conceptual diagram showing the measurement process performed by the image processing device 200 in chronological order.

In step S5, it is assumed that the image processing device 200 has received an instruction to execute the measurement process. For example, the execution instruction is issued each time an image is acquired from the imaging part of the image processing device 200. On the basis of the receipt of the instruction to execute the measurement process, the CPU 201 of the image processing device 200 refers to the process flow 111 stored in the storage device 222 to specify a first image process to be executed. In the example of FIG. 3, an image process "expansion" is specified. The CPU 201 refers to the storage location information 130 stored in the storage device 222 to specify a storage location of an image processing program for realizing the image process "expansion" and acquires the image processing program from the storage location. Since the FPGA 202 has been associated as an entity for executing the image process "expansion," the CPU 201 reconstructs the circuit configuration of the FPGA 202 according to the acquired image processing program. Thereby, each circuit element of the FPGA 202 is reconnected. Thereafter, the FPGA 202 executes the image process "expansion" according to the reconfigured circuit configuration.

In step S6, the CPU 201 of the image processing device 200 refers to the process flow 111 stored in the storage device 222 and specifies a second image process to be executed. In the example of FIG. 3, an image process "contraction" is specified. The CPU 201 of the image processing device 200 refers to the storage location information 130 stored in the storage device 222 to specify a storage location of an image processing program for realizing the image process "contraction," and acquires the image processing program from the storage location. Since the FPGA 202 has been associated as an entity for executing the image process "contraction," the CPU 201 reconfigures the circuit configuration of the FPGA 202 according to the acquired image processing program. Thereby, each circuit element of the FPGA 202 is reconnected. Thereafter, the FPGA 202 executes the image process "contraction" according to the reconfigured circuit configuration.

In step S7, the CPU 201 of the image processing device 200 refers to the process flow 111 stored in the storage device 222 to specify a third image process to be executed. In the example of FIG. 3, an image process "weak smoothing" is specified. The CPU 201 of the image processing device 200 refers to the storage location information 130 stored in the storage device 222 to specify a storage location of an image processing program for realizing the image process "weak smoothing," and acquires the image processing program from the storage location. Since the FPGA 202 has been associated as an entity for executing the image process "weak smoothing," the CPU 201 reconstructs the circuit configuration of the FPGA 202 according to the acquired image processing program. Thereby, each circuit element of the FPGA 202 is reconnected. Thereafter, the FPGA 202 executes the image process "weak smoothing" according to the reconfigured circuit configuration.

As described above, on the basis of the receipt of the instruction to execute the process flow 111, the image processing device 200 sequentially reads image processing programs from their storage locations of the storage device 222 (a first storage part) defined in the storage location information 130 according to the execution order defined in the process flow 111 and reconfigures the circuit configuration of the FPGA 202 according to the image processing programs. The storage location information 130 is generated each time the process flow 111 is designed. Therefore, even when the process flow 111 has been updated, the image processing device 200 can specify the storage location of each function for realizing the process flow 111.

Although FIG. 3 has been described with reference to an example in which the CPU 201 rewrites the circuit configuration of the FPGA 202, the circuit configuration of the FPGA 202 may be rewritten by other control device. For example, the circuit configuration of the FPGA 202 may be rewritten by a direct memory access (DMA) controller.

B. [Overall System Configuration]

Figure 4:
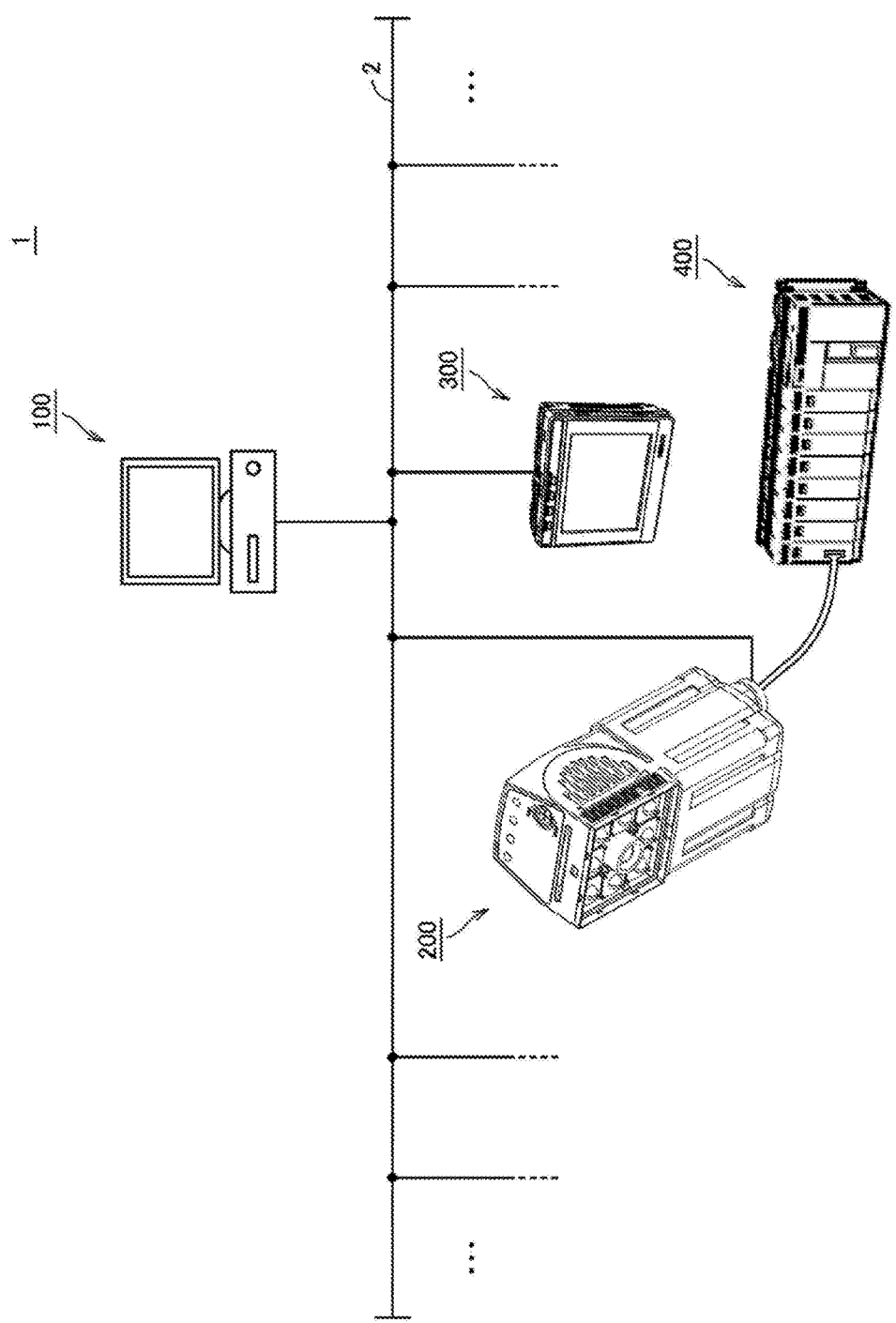
FIG. 4 is a schematic diagram showing the overall configuration of an image processing system according to the embodiment.

Next, an overall configuration of the image processing system 1 according to the present embodiment will be described. FIG. 4 is a schematic diagram showing the overall configuration of the image processing system 1. As shown in FIG. 4, the image processing system 1 includes a setting device 100, one or more image processing devices 200 and a display setter 300 connected to the setting device 100 via a network 2. A programmable logic controller (PLC) 400 is connected to each of the image processing devices 200.

For example, the display setter 300 displays settings of parameters or the like of image processes to be executed on the image processing device 200 and displays inspection results obtained by execution of image processes on the image processing device 200.

The PLC 400 exchanges timing signals, result information, or the like with the image processing device 200. The PLC 400 can also perform overall control of the image processing system 1 by receiving a signal from another device or transmitting a signal to anther device.

The PLC 400 may also be connected to each of the image processing devices 200 via the network 2 and the display setter 300 may be directly connected to the image processing devices 200.

In the image processing system 1 shown in FIG. 4, each of the image processing devices 200 performs a measurement process by imaging a subject within its field of view in response to a trigger signal from the PLC 400 or the like and then processing an image obtained by the imaging. This measurement process may be repeated at intervals of a predetermined period or may be performed on an event basis in response to a trigger signal from the PLC 400 or the like. Image processes that are executed by the image processing device 200 can be reordered appropriately as described above. Therefore, when a plurality of image processing devices 200 are arranged side by side in the same production line as shown in FIG. 1, the image processing devices 200 may be allowed to execute different image processes on the same object to be inspected and to output their respective measurement results.

C. [Functional Elements of Image Processing System 1]

Figure 5:
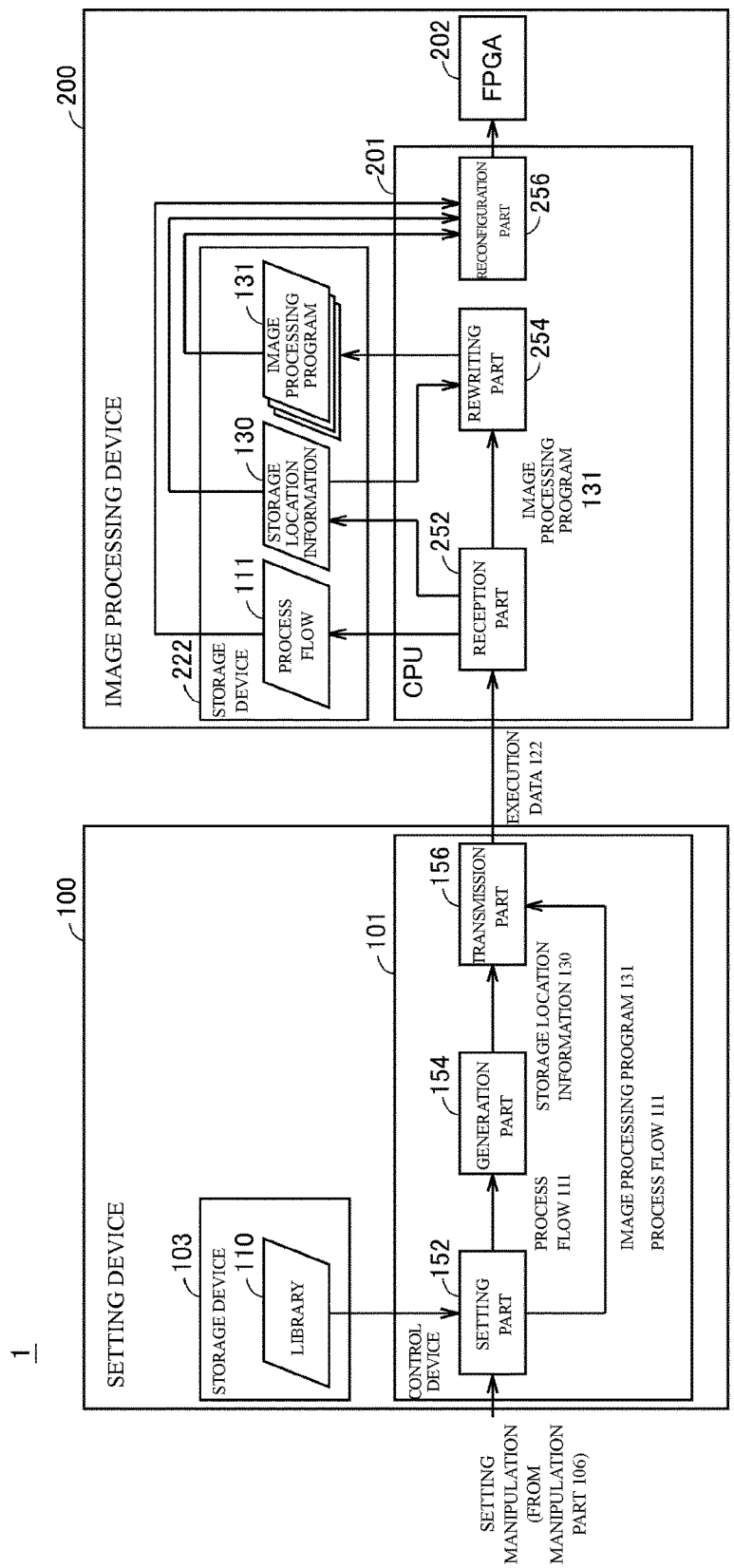
FIG. 5 is a diagram showing exemplary functional elements of an image processing system according to the embodiment.

The functions of the image processing system 1 will be described with reference to FIGS. 5 to 9. FIG. 5 is a diagram showing exemplary functional elements of the image processing system 1. As shown in FIG. 5, the image processing system 1 includes the setting device 100 and the image processing device 200.

In the following, the functional elements of the setting device 100 and the functional elements of the image processing device 200 will be sequentially described. The installation locations of the functional elements of the setting device 100 and the image processing device 200 are not limited to those of the example of FIG. 5. For example, some of the functional elements of the setting device 100 may be installed on the image processing device 200 or may be installed on a device such as a server. Similarly, some of the functional elements of the image processing device 200 may be installed on the setting device 100 or may be installed on a device such as a server.

(C1. Functional Elements of Setting Device 100)

The setting device 100 includes a control device 101 and a storage device 103 as main hardware elements. The control device 101 includes a setting part 152, a generation part 154, and a transmission part 156 as functional elements.

Figure 6:
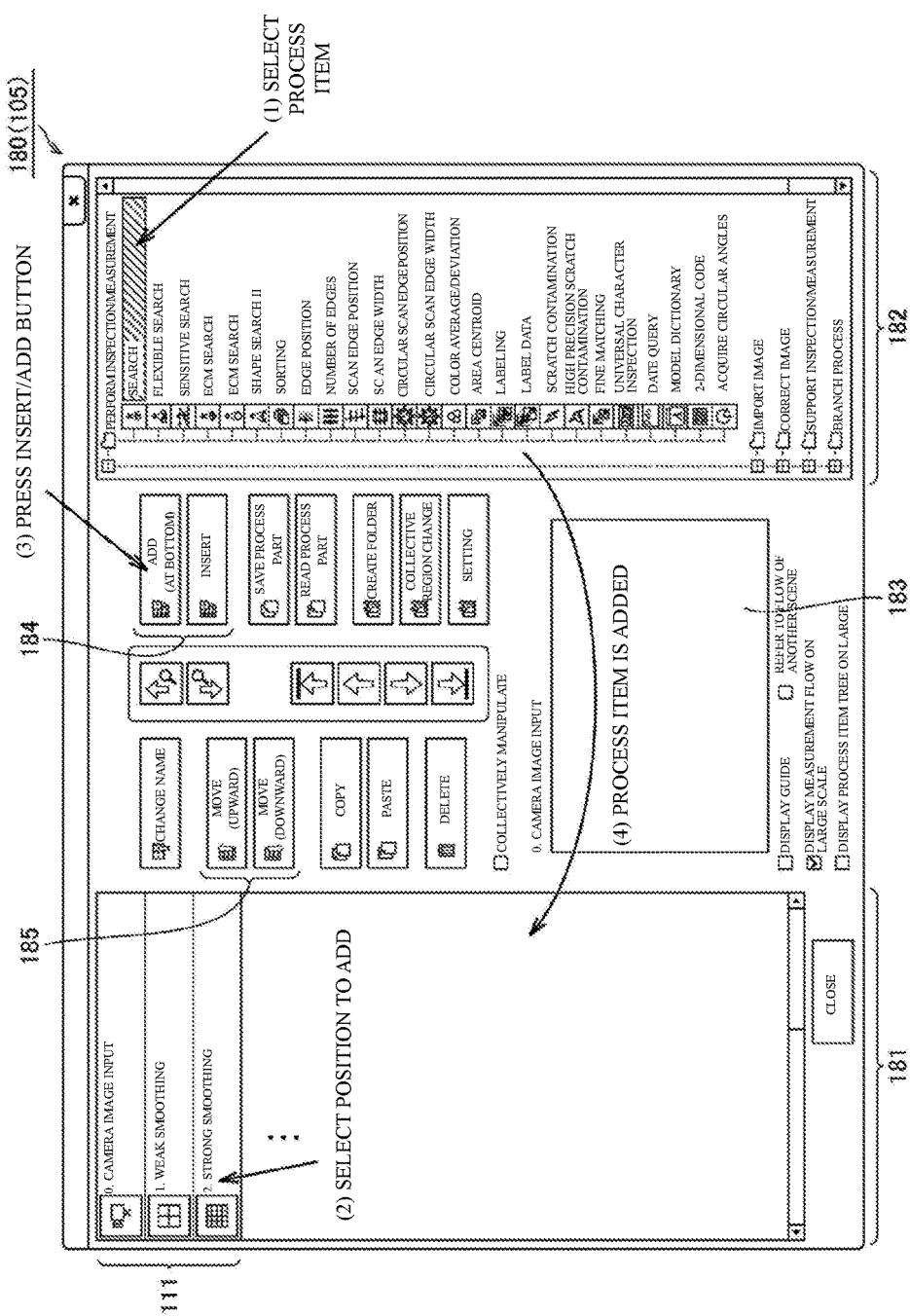
FIG. 6 is a diagram showing a user interface provided by a setting part.

The setting part 152 provides a user interface for receiving a manipulation of selecting one or more image processing programs from the library 110 including a plurality of preinstalled image processing programs and a manipulation of designating the execution order of each of the image processing programs to be selected, which have been selected through the manipulation. FIG. 6 is a diagram showing the user interface 180 provided by the setting part 152.

The user interface 180 is displayed, for example, on the display part 105 of the setting device 100. The user interface 180 includes a set item display region 181, a process item selection region 182, a camera image display region 183, a process item insert/add button 184, and an execution order switching button 185. The current settings of processes are graphically displayed in the set item display region 181. Icons indicating selectable process items are listed and displayed together with their names in the process item selection region 182.

The user selects a process item necessary for a target image process on the process item selection region 182 of the user interface 180 ((1) selects a process item) and selects a position (an ordinal position) at which the process item selected on the set item display region 181 is to be added ((2) selects a position for addition). When the user selects the process item insert/add button 184 ((3) presses the insert/add button), the process item is added ((4) process item is added). The settings of processes after the process item is added are reflected in the set item display region 181.

The user repeats this procedure as appropriate to create a process flow for realizing a target measurement process. During or after the creation of the process settings, the user can appropriately change the execution order by selecting the execution order switching button 185 with a process item being selected on the set item display region 181.

The setting part 152 displays image processing programs included in the library 110 on the process item selection region 182 as selectable image process items. The library 110 will now be described with reference to FIG. 7. FIG. 7 is a diagram showing an exemplary data structure of the library 110.

As shown in FIG. 7, the library 110 includes identification information 110A for identifying each image processing program, an image processing program group 110B that can be executed by the CPU 201 of the image processing device 200, and an image processing program group 110C that can be executed by the FPGA 202 of the image processing device 200. The image processing program group 110B and the image processing program group 110C have the same processing content. The "same processing content" referred to here means processes giving the same or substantially the same results for a predetermined input. Since the same or substantially the same image processing is prepared for each of the CPU and the FPGA, each image process included in the library 110 can be executed by both the CPU and the FPGA.

The image processing program groups 110B and 110C are, for example, function modules (typically, image processing program modules). Each function module includes an instruction code or an execution module for realizing the image processing.

Referring again to FIG. 5, the setting part 152 further provides a user interface 140 for designating entities for executing the image processes included in the user-set process flow 111. FIG. 8 is a diagram showing the user interface 140 provided by the setting part 152.

The user interface 140 has a designation region 112 for designating executing entities. In the example of FIG. 8, select boxes 112A are shown in the designation region 112 as objects to receive designation of the executing entities. The select boxes 112A are displayed alongside their corresponding image process items in the process flow 111. When a select box 112A is selected, a menu 112B is expanded. The user can select any item shown in the menu 112B.

When the user presses an OK button 118 after designating the executing entities on the designation region 112, the setting part 152 reflects a combination of the designated executing entities in the process flow 111 (see FIG. 2) and then closes the user interface 140. When the user presses a cancel button 119, the setting device 100 closes the user interface 140 without reflecting the combination of the designated executing entities in the process flow 111.

The user interface 140 for designating the executing entities is not limited to that of the example of FIG. 8. The executing entities may be designated in other manners. FIG. 9 is a diagram showing a modification of the user interface 140. In FIG. 9, a user interface 140A is shown as a modification.

The user interface 140A includes a designation region 135 for designating entities for executing image processes included in a process flow 111. In the example of FIG. 9, check boxes are shown in the designation region 135. The check boxes are displayed alongside their corresponding image process items in the process flow 111.

The user can designate one executing entity for each image process included in the process flow 111. For example, when a check box of an item "expansion" of the executing entity "FPGA" is selected, a check mark is added to the check box. At this time, a check mark is erased from a check box of an item "expansion" of the executing entity "CPU." In this manner, only one executing entity can be designated for one image process. The execution order is displayed for the selected check box.

When the user presses an OK button 118 after designating the executing entities in the designation region 135, the setting part 152 reflects a combination of the designated executing entities in the process flow 111 (see FIG. 2) and then closes the user interface 140A. When the user presses a cancel button 119, the setting device 100 closes the user interface 140A without reflecting the combination of the designated executing entities in the process flow 111.

Referring again to FIG. 5, the generation part 154 generates the storage location information 130 described above (see FIG. 2) on the basis of the user-set process flow 111. The execution order of each image process included in the process flow 111, the identification information for identifying the type of the image process, and the storage destination of each image processing program for realizing the process flow 111 are associated with each other in the storage location information 130.

The storage destination of each image processing program is determined in various manners. As an example, storage locations for the image processing program are secured in advance in the image processing device 200 and the secured storage locations are divided into units of predetermined sizes. The generation part 154 specifies empty areas from the pre-divided storage locations and determines one of the empty areas as the storage destination of the image processing program.

When the storage location information 130 has already been generated, the generation part 154 updates the storage location information 130. More specifically, for each image process that is not defined in the storage location information 130 before being updated among the image processes included in the process flow 111 that has been set this time, the generation part 154 adds a new storage destination to the storage location information 130. For image processes that are already defined in the storage location information 130 before being updated among the image processes included in the process flow 111 that has been set this time, the generation part 154 compares versions of the same type of image processes. The generation part 154 does not update the storage destinations of image processes having the same version in the storage location information 130. For image processes having different versions, the generation part 154 updates their storage destinations already defined in the storage location information 130.

The transmission part 156 transmits the user-set process flow 111, the storage location information 130, and the image processing programs 131 for realizing the process flow 111 to the designated image processing device 200. The process flow 111, the storage location information 130, and the image processing programs 131 may be transmitted in a single data item as the execution data 122 to the image processing device 200 or may be individually transmitted to the image processing device 200.

(C2. Functional Elements of Image Processing Device 200)

Still referring to FIG. 5, the functional elements of the image processing device 200 will be described. The image processing device 200 includes the CPU 201, the FPGA 202, and the storage device 222 as main hardware elements. The CPU 201 includes a reception part 252, a rewriting part 254, and a reconfiguration part 256 as functional elements.

The reception part 252 receives the user-set process flow 111, the storage location information 130, and the image processing programs 131 for realizing the process flow 111 from the setting device 100. The process flow 111 and the storage location information 130 that have been received are stored in the storage device 222 of the image processing device 200. The received image processing program 131 is output to the rewriting part 254.

The rewriting part 254 writes the image processing programs 131 to their storage destinations defined in the storage location information 130. Thereby, the image processing programs 131 are written to the storage destinations designated by the setting device 100.

On the basis of the receipt of an instruction to execute the process flow 111, the reconfiguration part 256 sequentially reads the image processing programs from the storage locations defined in the storage location information 130 according to the execution order defined in the process flow 111. When the FPGA 202 has been designated as an entity for executing each read image process, the reconfiguration part 256 sequentially reconstructs the circuit configuration of the FPGA 202 according to the read image processing program. Thereafter, the FPGA 202 executes the image process according to the current circuit configuration. When the CPU 201 has been designated as an entity for executing each read image processing program, the CPU 201 executes the read image processing program.

[D. Process Flow Update Procedure]

Figure 10:
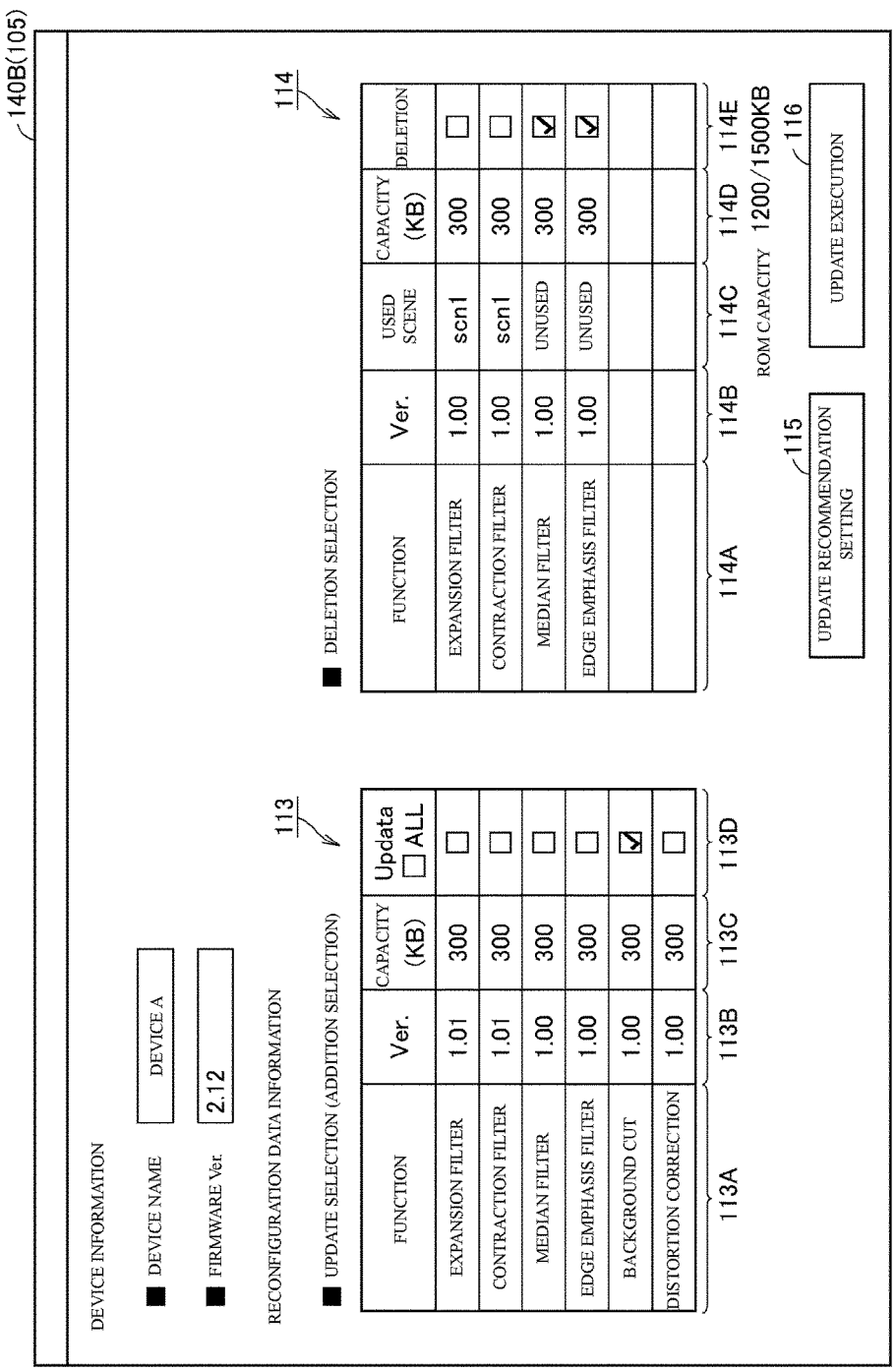
FIG. 10 is a diagram showing a user interface for updating a user-set process flow.

A procedure for updating a user-set process flow will now be described with reference to FIGS. 10 and 11. FIG. 10 is a diagram showing a user interface 140B for updating the user-set process flow. The user interface 140B is provided, for example, by the above-described setting part 152 (see FIG. 5).

The user interface 140B is configured to be able to receive an update manipulation for updating each image process included in the process flow 111, an addition manipulation for adding a new image process to a currently set process flow 111, and a deletion manipulation for deleting an image process from the currently set process flow 111.

More specifically, the user interface 140B includes an add/update section 113 for selecting an image process to be added or updated, and a delete section 114 for selecting an image process to be deleted. The add/update section 113 includes an addable or updatable function list 113A, version information 113B of each image process, capacity information 113C of each image process, and a select section for selecting an image process to be updated or added. The delete section 114 includes a deletable function list 114A, version information 114B of each image process, a used scene 114C of each image process, capacity information 114D of each image process, and a select section 114E for selecting an image process to be deleted.

The user can designate an image process to be added or updated by selecting a check box in the select section 113D. Similarly, the user can specify an image process to be deleted by selecting a check box in the select section 114E. When the user presses a recommendation button 115, image processes recommended to be added, updated, and deleted are automatically determined. Check boxes for image processes recommended to be added, updated, and deleted are brought to a selected state and check boxes for the other image processes are brought to an unselected state.

When an execution button 116 is pressed with an image process to be updated or added being selected in the select section 113D, the setting device 100 acquires storage location information 130 from the designated image processing device 200 and updates the storage location information 130. The setting device 100 determines whether the image process selected in the select section 113D is to be updated or added. As an example, when the image process selected in the select section 113D is already defined in the storage location information 130, the setting device 100 determines that the image process is to be updated. In this case, the setting device 100 updates the storage location information 130 such that the image processing program before being updated is replaced with the updated image processing program. When the image process selected in the select section 113D is not defined in the storage location information 130, the setting device 100 determines that the image process is to be added. In this case, the setting device 100 adds the storage location of the image processing program to be added to the storage location information 130A.

When the execution button 116 is pressed with an image process to be deleted being selected in the select section 114E, the setting device 100 acquires storage location information 130 from the designated image processing device 200 and deletes information regarding the image process to be deleted from the storage location information 130. More specifically, the setting device 100 deletes the storage location of an image processing program specified by the deletion manipulation from the storage locations defined in the storage location information 130.

Figure 11A:
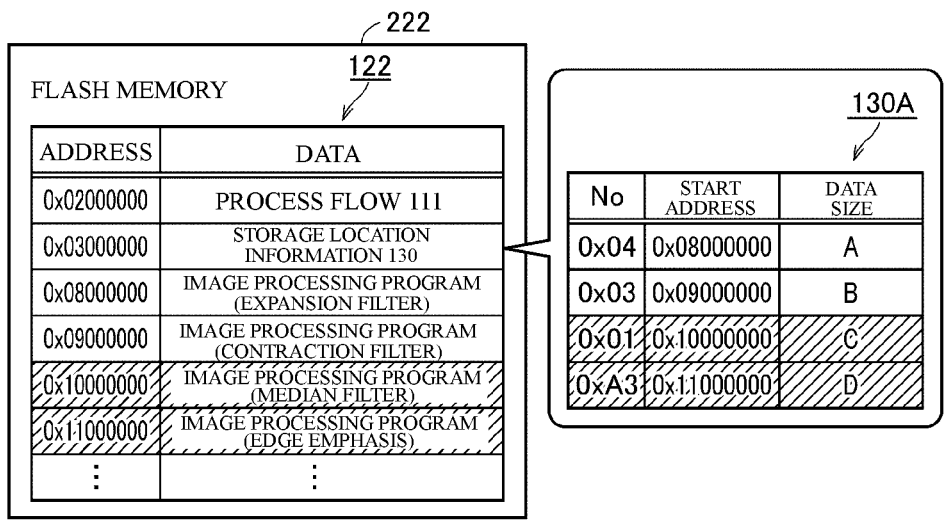
FIG. 11A and FIG. 11B are diagrams showing an exemplary memory structure of a storage device of an image processing device according to the embodiment.
Figure 11B:
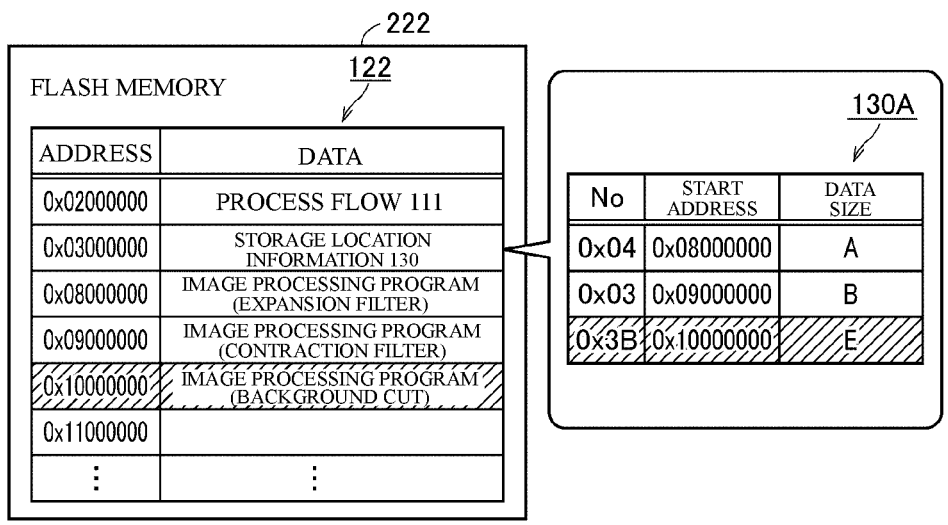

As an example, it is assumed that an image processing function "background cut" is selected as an object to be added and image processing functions "median filter" and "edge emphasis filter" are selected as objects to be deleted. A procedure for updating the storage location information 130 under these conditions will be described with reference to FIG. 11A and FIG. 11B. FIG. 11A and FIG. 11B are diagrams showing an exemplary memory structure of the storage device 222 of the image processing device 200. More specifically, FIG. 11A shows the memory structure of the storage device 222 before being updated. FIG. 11B shows the memory structure of the storage device 222 after being updated.

The setting device 100 adds the storage destination of the image processing function to be added "background cut" to the storage location information 130A and deletes the storage locations of the image processing functions to be deleted "median filter" and "edge enhancement filter" from the storage location information 130A. As a result, the storage location information 130A before being updated becomes the storage location information 130B.

Thereafter, the setting device 100 transmits the updated storage location information 130B and an image processing program for realizing the image processing function "background cut" to be added to the image processing device 200. At the same time, the setting device 100 transmits a command to delete the image processing functions "median filter" and "edge emphasis filter." The image processing device 200 replaces the storage location information 130A stored in the storage device 222 with the updated storage location information 130B and writes the image processing program for realizing the image processing function "background cut" which is to be added to a storage location defined in the storage location information 130B. The image processing device 200 also deletes image processing programs for realizing the image processing functions "median filter" and "edge emphasis filter" which are to be deleted from the storage device 222.

[E. Data Flow]

Figure 12:
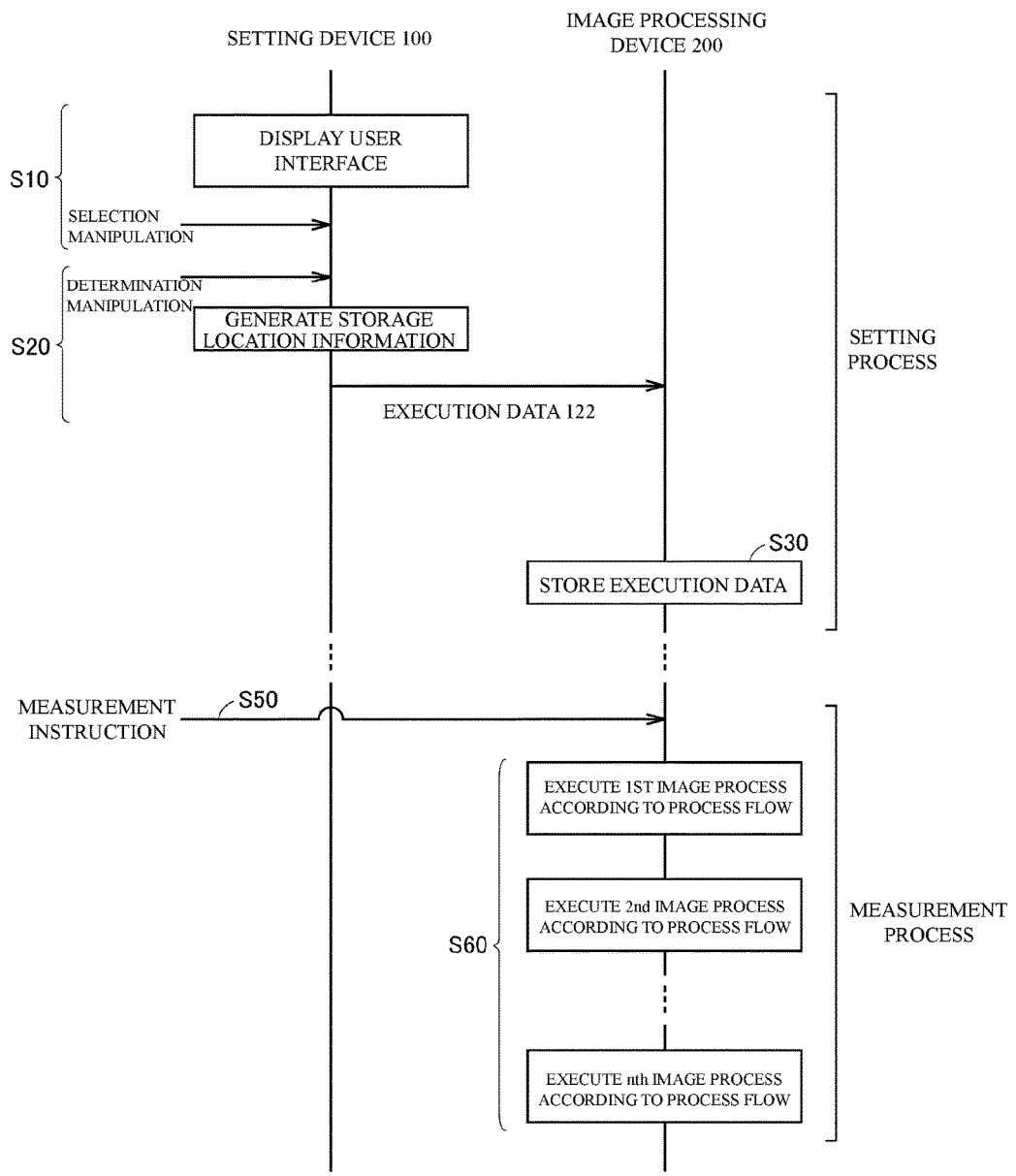
FIG. 12 is a sequence diagram showing a data flow between the setting device and the image processing device according to the embodiment.

A data flow between the setting device 100 and the image processing device 200 will be described with reference to FIG. 12. FIG. 12 is a sequence diagram showing a data flow between the setting device 100 and the image processing device 200.

In step S10, it is assumed that the setting device 100 has received an instruction to execute an application for designing a process flow 111. On the basis of this, the setting device 100 displays the above-described user interface 180 (see FIG. 6) on the display part 105 through the above-described setting part 152 (see FIG. 5). The user interface 180 is configured to be able to receive a selection manipulation for selecting one or more image processing programs from a preinstalled library and a designation manipulation for designating the execution order of the image processing programs to be selected through the selection manipulation. This allows the user to arbitrarily combine image processes and to realize various process flows 111.

In step S20, the setting device 100 generates the above-described storage location information 130 (see FIG. 2) through the above-described generation part 154 (see FIG. 5). The execution order of each image process included in the process flow 111, identification information for identifying the type of the image process, and the storage destination of each image processing program for realizing the process flow 111 are associated with each other in the storage location information 130. Through the above-described transmission part 156 (see FIG. 5), the setting device 100 transmits the user-set process flow 111, the generated storage location information 130, and the image processing program 131 for realizing the process flow 111 to the image processing device 200 as execution data 122.

In step S30, the image processing device 200 receives the execution data 122 from the setting device 100 through the above-described reception part 252 (see FIG. 5). Thereafter, the image processing device 200 acquires the storage location information 130 and the image processing program 131 from the execution data 122. The image processing device 200 writes the image processing program 131 to the storage device 222 according to the storage location defined in the storage location information 130 through the above-described rewriting part 254 (see FIG. 5). As a result, the image processing program 131 is written to the designated storage location. Thereafter, the image processing device 200 writes the process flow 111 and the storage location information 130 included in the execution data 122 to the storage device 222.

In step S50, it is assumed that the image processing device 200 has received a workpiece measurement instruction. For example, the measurement instruction is issued each time an image is acquired from the imaging part of the image processing device 200.

In step S60, the image processing device 200 reads the process flow 111 and the storage location information 130 from the storage device 222. The image processing device 200 sequentially reads image processing programs from their storage locations defined in the storage location information 130 according to the execution order defined in the process flow 111 through the above-described rewriting part 254 (see FIG. 5).

More specifically, the image processing device 200 refers to the process flow 111 to specify a first image process to be executed. The image processing device 200 refers to the storage location information 130 to specify the storage location of the image processing program for realizing the image process and acquires the image processing program from the storage location. When the FPGA 202 has been associated as an entity for executing the acquired image processing program, the image processing device 200 reconfigures the circuit configuration of the FPGA 202 according to the image processing program and causes the FPGA 202 to execute the image processing program. When the CPU 201 has been associated as an executing entity of the acquired image processing program, the image processing device 200 causes the CPU 201 to execute the image processing program.

Thereafter, the image processing device 200 refers to the process flow 111 to specify a second image process to be executed. The image processing device 200 refers to the storage location information 130 to specify the storage location of the image processing program for realizing the image process and acquires the image processing program from the storage location. When the FPGA 202 has been associated as an entity for executing the acquired image processing program, the image processing device 200 reconfigures the circuit configuration of the FPGA 202 according to the image processing program and causes the FPGA 202 to execute the image processing program. When the CPU 201 has been associated as an entity for executing the acquired image processing program, the image processing device 200 causes the CPU 201 to execute the image processing program.

The user-set process flow 111 is realized by sequentially executing the above processes according to the execution order defined in the process flow 111.

[F. Device Configuration of Image Processing System 1]

Figure 13:
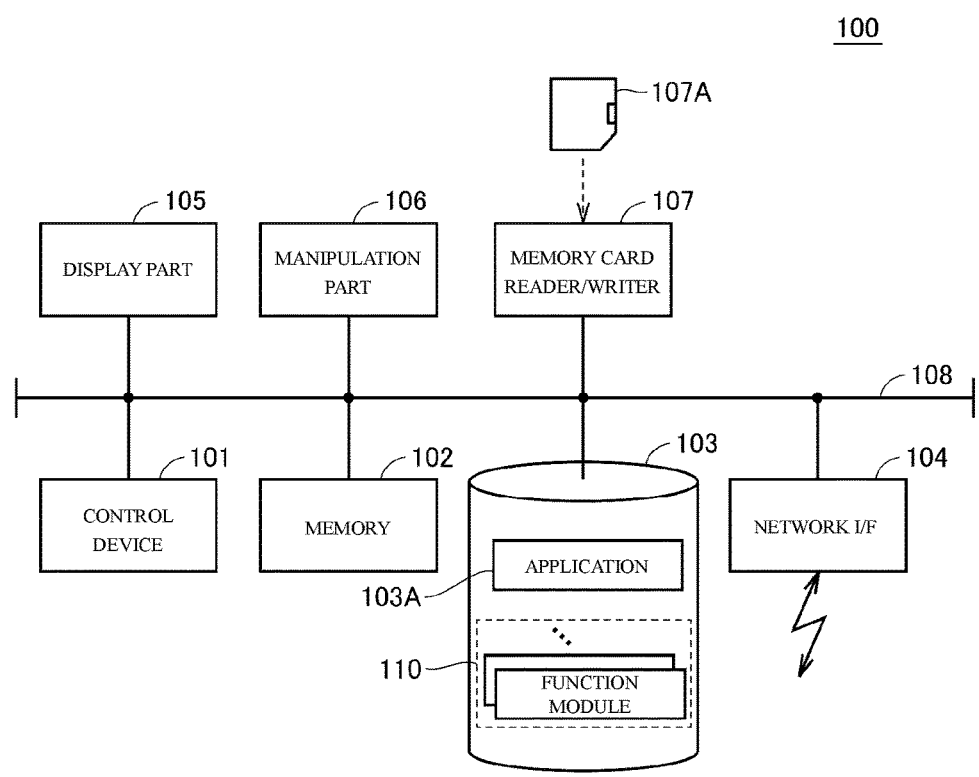
FIG. 13 is a block diagram showing main hardware elements of the setting device according to the embodiment.
Figure 14:
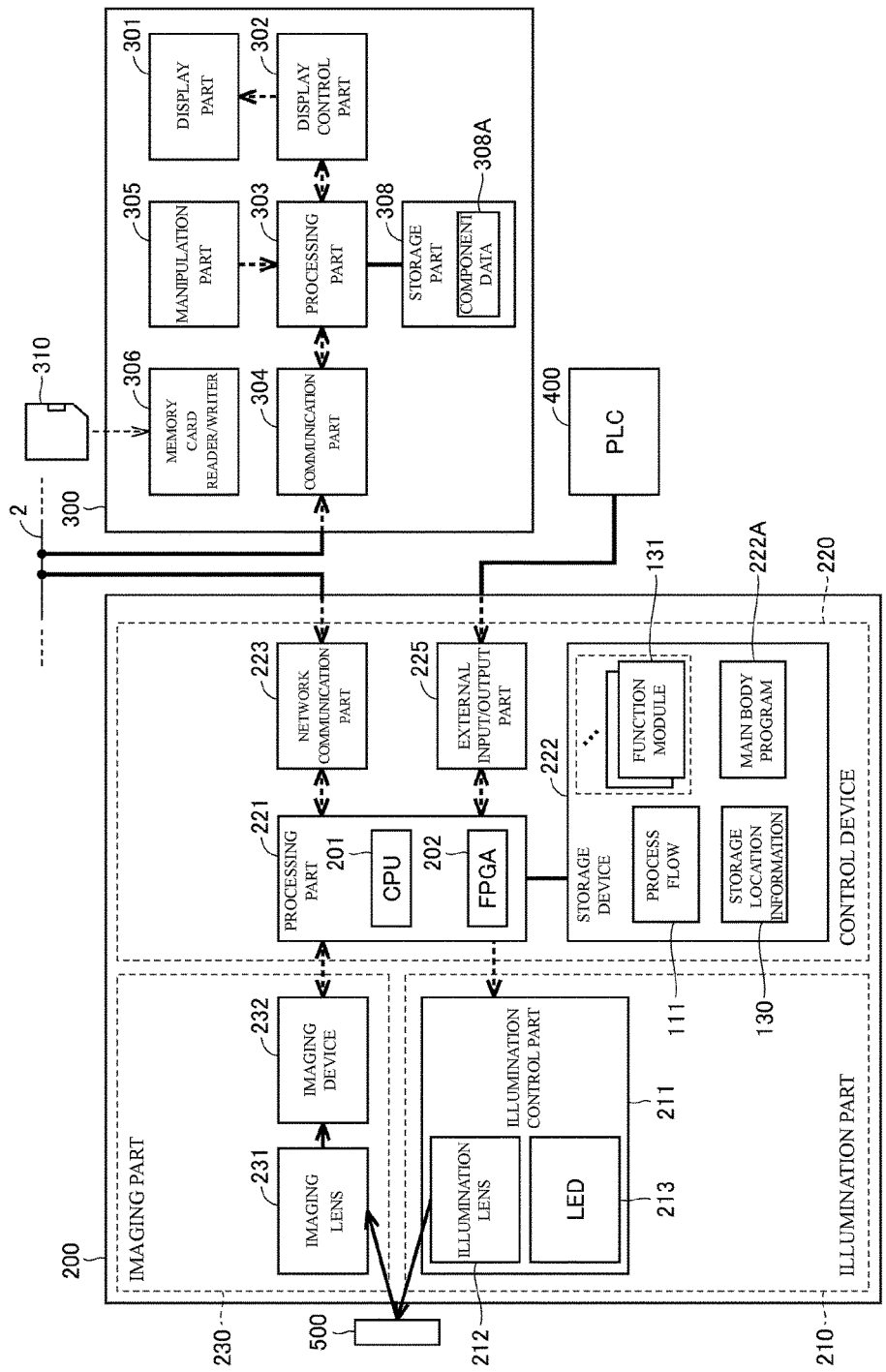
FIG. 14 is a block diagram showing main hardware elements of the image processing device and a display setter according to the embodiment.

The configuration of each of the devices which constitute the image processing system 1 will be described with reference to FIGS. 13 and 14. FIG. 13 is a block diagram showing main hardware elements of the setting device 100. FIG. 14 is a block diagram showing main hardware elements of the image processing device 200 and the display setter 300.

(F1: Setting Device 100)

The setting device 100 is typically realized by a general-purpose computer but may also be realized by a smart phone, a tablet terminal, or other information processing device having a communication function. The setting device 100 includes a control device 101, a memory 102, a storage device 103 such as a hard disk drive (HDD), a network interface (I/F) 104, a display part 105, a manipulation part 106, and a memory card reader/writer 107. These parts are communicably connected to each other via an internal bus 108.

The control device 101 realizes the various functions described above by developing a program (an instruction code) stored in the storage device 103 or the like in the memory 102 and executing the program developed in the memory. The memory 102 and the storage device 103 store data in a volatile manner and in a nonvolatile manner, respectively. The storage device 103 holds an application 103A and the above-described library 110 (see FIG. 7) in addition to an operating system (OS).

The application 103A is a basic program that provides the above-described user interfaces 140, 140A, 140B, and 180. All or a part of the library 110 is transmitted to the image processing device 200 in response to a user manipulation. That is, the image processing programs 131 (see FIG. 14) stored in the storage device 222 of the image processing device 200 are at least a subset of the library 110 stored in the storage device 103 of the setting device 100.

The network interface 104 exchanges data between the setting device 100 and the image processing device 200 via the network 2 (see FIG. 1).

The display part 105 displays setting manipulation screens (for example, the user interfaces 140, 140A, 140B, and 180) or the like realized by the control device 101 executing the application 103A. The display part 105 includes a display such as a liquid crystal display (LCD) or the like.

The manipulation part 106 receives a user manipulation and outputs an internal command indicating the received manipulation to the control device 101 or the like. The manipulation part 106 typically includes a keyboard, a mouse, a touch panel, a tablet, a voice recognition device, or the like.

The memory card reader/writer 107 reads data from the memory card 107A and writes data to the memory card 107A. A known recording medium such as a secure digital (SD) card can be adopted as the memory card 107A.

(F2: Image Processing Device 200)

Next, the configuration of the image processing device 200 will be described with reference to FIG. 14. The image processing device 200 includes an illumination part 210, a control device 220, and an imaging part 230.

The illumination part 210 emits light necessary for imaging onto a workpiece 500 to be inspected. That is, the illumination part 210 irradiates the imaging range of the imaging part 230 with light. More specifically, the illumination part 210 includes a plurality of illumination control parts 211 provided on an illumination board. These parts are arranged on the illumination board. Each of the illumination control parts 211 includes an illumination lens 212 and an LED 213. The illumination control part 211 emits light according to a command from the control device 220. More specifically, light generated by an LED 213 is emitted to the workpiece 500 through the illumination lens 212.

The imaging part 230 receives reflected light of the light emitted by the illumination part 210 and outputs an image signal. This image signal is sent to the control device 220. More specifically, the imaging part 230 includes an optical system such as an imaging lens 231 and further includes an imaging device 232 such as a coupled charged device (CCD) or complementary metal oxide semiconductor (CMOS) image sensor which is divided into a plurality of pixels.

The control device 220 controls the entire image processing device 200. That is, the control device 220 controls the illumination part 210 and the imaging part 230 and performs image processing on the basis of the image signal from the imaging part 230. More specifically, the control device 220 includes a processing part 221, a storage device 222, a network communication part 223, and an external input/output part 225.

The processing part 221 is formed of an integrated circuit such as the CPU 201 and the FPGA 202. Alternatively, the processing part 221 may be formed of a DSP, a GPU, an application specific integrated circuit (ASIC), or other integrated circuit.

The storage device 222 includes a read only memory (ROM), a flash memory, an HDD, a nonvolatile storage device such as a static silicon disk (SSD), and/or a nonvolatile memory such as a read only memory (RAM). Typically, the processing part 221 realizes various types of image processes by executing a program (an instruction code), a module, or the like stored in the storage device 222.

The program (instruction code), the module, or the like are stored in the nonvolatile memory of the storage device 222, and the program read from the nonvolatile memory, work data necessary to execute the program, image data acquired by the imaging part 230, data indicating measurement results, or the like are stored in the volatile memory of the storage device 222.

More specifically, the storage device 222 stores the user-set process flow 111 received from the setting device 100, the storage location information 130 received from the setting device 100, the image processing program 131 received from the setting device 100, and a main body program 222A.

The main body program 222A is a basic program for realizing basic operations of the image processing device 200 and may include an OS and a basic application. Typically, the capacity of the storage device 222 in the image processing device 200 is smaller than the capacity of the storage device 103 in the setting device 100. Therefore, the same number of image processing programs 131 as the number of image processing functions executable by the image processing device 200 are installed. That is, the image processing programs 131 are at least a subset of the library 110 stored in the storage device 103 of the setting device 100.

The network communication part 223 is an interface for exchanging data with the setting device 100 and the display setter 300 via the network 2. More specifically, the network communication part 223 adopts a configuration according to Ethernet (registered trademark) or the like. The external input/output part 225 is an interface for exchanging various data (input data and/or output data) with the PLC 400.

(F3: Display Setter 300)

Still referring to FIG. 14, the display setter 300 includes a display part 301, a display control part 30, a processing part 303, a communication part 304, a manipulation part 305, a memory card reader/writer 06, and a storage device 308.

The display part 301 displays a screen for setting parameters or the like of image processes to be executed on the image processing device 200 to which the display part 301 is connected, a screen showing inspection results obtained by execution of image processes on the image processing device 200, or the like. The display part 105 typically includes a display such as a liquid crystal display (LCD) or the like. The display control part 302 performs a process for displaying an image on the display part 301 according to an instruction from the processing part 303.

The processing part 303 performs a process of generating an image to be displayed on the display part 301 according to an instruction/command from the image processing device 200 and sends, in response to a user input through the manipulation part 305, the input value to the image processing device 200.

The storage device 308 includes a ROM, a flash memory, an HDD, a nonvolatile storage device such as a static silicon disk (SSD), and/or a nonvolatile memory such as a RAM. The storage device 308 stores objects used for screen display as component data 308A. The processing part 303 performs screen display using the component data 308A.

The communication part 304 is an interface for exchanging data with the image processing device 200 or the like.

The manipulation part 305 receives a user manipulation and outputs an internal command indicating the received manipulation to the processing part 303 or the like. The manipulation part 305 typically includes a touch panel (a pressure-sensitive sensor), buttons, keys, or the like arranged on the surface of the display part 301.

The memory card reader/writer 306 reads data from the memory card 310 and writes data to the memory card 310. A known recording medium such as an SD card can be adopted as the memory card 310.

[G. Summary]

As described above, the setting device 100 provides a user interface for designing the process flow 111 and defines the storage destinations of image processing programs for realizing the process flow 111 set by the user interface in the storage location information 130. Thereafter, the setting device 100 transmits the process flow 111 set by the user, the image processing programs for realizing the process flow 111, and the generated storage location information 130 to the image processing device 200. The image processing device 200 writes each of the image processing programs received from the information processing device to the storage destinations defined in the storage location information 130. On the basis of the receipt of an instruction to execute the process flow 111, the image processing device 200 sequentially reads the image processing programs from the storage locations defined in the storage location information 130 according to the execution order defined in the process flow 111 and reconfigures the circuit configuration of the FPGA 202 according to the image processing programs.

Since the storage location information 130 is generated each time the process flow 111 is designed, the image processing device 200 can specify the storage location of each function for realizing the process flow 111 even when the process flow 111 has been updated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing system comprising:
an image processing device; and
an information processing device configured to be communicable with the image processing device,
wherein the image processing device comprises:
a first storage circuit; and
a field programmable gate array (FPGA) configured to be able to reconfigure an internal circuit configuration,
the information processing device comprises:
a second storage circuit configured to store a library comprising a plurality of image processing programs that are executable by the FPGA;
a controller configured to function as a setting part, a generation part, and a transmission part, wherein
the setting part is configured to provide a user interface configured to be able to receive a selection manipulation for selecting one or more of the plurality of image processing programs from the library and a designation manipulation for designating an execution order of the plurality of image processing programs to be selected by the selection manipulation;
the generation part is configured to generate storage location information defining a storage location in the first storage circuit for each of the plurality of image processing programs to be selected; and
the transmission part is configured to transmit the plurality of image processing programs to be selected, a process flow defining the execution order of the plurality of image processing programs, and the storage location information to the image processing device, and
the image processing device further comprises:
a processor configured to function as a rewriting part and a reconfiguration part, wherein
the rewriting part is configured to write each of the plurality of image processing programs received from the information processing device to a storage location of the first storage circuit defined in the storage location information; and
the reconfiguration part is configured to sequentially read each of the plurality of image processing programs from the storage location of the first storage circuit defined in the storage location information according to the execution order defined in the process flow on a basis of receipt of an instruction to execute the process flow and to reconfigure a circuit configuration of the FPGA according to the read image processing program.

2. The image processing system according to claim 1, wherein a capacity of the first storage circuit in the image processing device is smaller than a capacity of the second storage circuit in the image processing device.

3. The image processing system according to claim 2, wherein the storage location information defines both a start address and a data size of each of the plurality of image processing programs to be selected as the storage location, both the start address and the data size indicating a storage destination of each of the plurality of image processing programs to be selected in the first storage circuit.

4. The image processing system according to claim 3, wherein the user interface is configured to be able to receive an addition manipulation for adding a new image processing program to the plurality of image processing programs to be selected, and
the generation part is configured to add a storage destination of the new image processing program in the first storage circuit to the storage location information on a basis of receipt of the addition manipulation by the user interface.

5. The image processing system according to claim 3, wherein the user interface is configured to be able to receive a deletion manipulation for deleting a specific image processing program from the plurality of image processing programs to be selected, and
the generation part is configured to delete a storage location of an image processing program designated by the deletion manipulation from storage locations defined in the storage location information on a basis of receipt of the deletion manipulation by the user interface.

6. The image processing system according to claim 2, wherein the user interface is configured to be able to receive an addition manipulation for adding a new image processing program to the plurality of image processing programs to be selected, and
   the generation part is configured to add a storage destination of the new image processing program in the first storage circuit to the storage location information on a basis of receipt of the addition manipulation by the user interface.

7. The image processing system according to claim 6, wherein the user interface is configured to be able to receive a deletion manipulation for deleting a specific image processing program from the plurality of image processing programs to be selected, and
   the generation part is configured to delete a storage location of an image processing program designated by the deletion manipulation from storage locations defined in the storage location information on a basis of receipt of the deletion manipulation by the user interface.

8. The image processing system according to claim 2, wherein the user interface is configured to be able to receive a deletion manipulation for deleting a specific image processing program from the plurality of image processing programs to be selected, and
   the generation part is configured to delete a storage location of an image processing program designated by the deletion manipulation from storage locations defined in the storage location information on a basis of receipt of the deletion manipulation by the user interface.

9. The image processing system according to claim 1, wherein the storage location information defines both a start address and a data size of each of the plurality of image processing programs to be selected as the storage location, both the start address and the data size indicating a storage destination of each of the plurality of image processing programs to be selected in the first storage circuit.

10. The image processing system according to claim 9, wherein the user interface is configured to be able to receive an addition manipulation for adding a new image processing program to the plurality of image processing programs to be selected, and
    the generation part is configured to add a storage destination of the new image processing program in the first storage circuit to the storage location information on a basis of receipt of the addition manipulation by the user interface.

11. The image processing system according to claim 10, wherein the user interface is configured to be able to receive a deletion manipulation for deleting a specific image processing program from the plurality of image processing programs to be selected, and
    the generation part is configured to delete a storage location of an image processing program designated by the deletion manipulation from storage locations defined in the storage location information on a basis of receipt of the deletion manipulation by the user interface.

12. The image processing system according to claim 9, wherein the user interface is configured to be able to receive a deletion manipulation for deleting a specific image processing program from the plurality of image processing programs to be selected, and
    the generation part is configured to delete a storage location of an image processing program designated by the deletion manipulation from storage locations defined in the storage location information on a basis of receipt of the deletion manipulation by the user interface.

13. The image processing system according to claim 1, wherein the user interface is configured to be able to receive an addition manipulation for adding a new image processing program to the plurality of image processing programs to be selected, and
    the generation part is configured to add a storage destination of the new image processing program in the first storage circuit to the storage location information on a basis of receipt of the addition manipulation by the user interface.

14. The image processing system according to claim 13, wherein the user interface is configured to be able to receive a deletion manipulation for deleting a specific image processing program from the plurality of image processing programs to be selected, and
    the generation part is configured to delete a storage location of an image processing program designated by the deletion manipulation from storage locations defined in the storage location information on a basis of receipt of the deletion manipulation by the user interface.

15. The image processing system according to claim 1, wherein the user interface is configured to be able to receive a deletion manipulation for deleting a specific image processing program from the plurality of image processing programs to be selected, and
    the generation part is configured to delete a storage location of an image processing program designated by the deletion manipulation from storage locations defined in the storage location information on a basis of receipt of the deletion manipulation by the user interface.

16. A method of reconfiguring a circuit of an FPGA provided in an image processing device, the method comprising:
    preparing a library comprising a plurality of image processing programs that are executable by the FPGA;
    providing a user interface configured to be able to receive a selection manipulation for selecting one or more of the plurality of image processing programs from the library and a designation manipulation for designating an execution order of the plurality of image processing programs to be selected by the selection manipulation;
    generating storage location information defining a storage location in a storage part of the image processing device for each of the plurality of image processing programs to be selected;
    transmitting the plurality of image processing programs to be selected, a process flow defining the execution order of the plurality of image processing programs, and the storage location information to the image processing device;
    writing each of the plurality of image processing programs to a storage location of the storage part defined in the storage location information in the image processing device; and
    sequentially reading, in the image processing device, each of the plurality of image processing programs from the storage location of the storage part defined in the storage location information according to the execution order defined in the process flow and reconfiguring a circuit configuration of the FPGA according to the read image processing program.

17. An information processing device configured to be communicable with an image processing device comprising a first storage circuit and an FPGA, the information processing device comprising:
- a second storage circuit configured to store a library comprising a plurality of image processing programs that are executable by the FPGA;
- a controller configured to function as a setting part, a generation part, and a transmission part, wherein
- the setting part is configured to provide a user interface configured to be able to receive a selection manipulation for selecting one or more of the plurality of image processing programs from the library and a designation manipulation for designating an execution order of the plurality of image processing programs to be selected by the selection manipulation;
- the generation part is configured to generate storage location information defining a storage location in the first storage circuit for each of the plurality of image processing programs to be selected; and
- the transmission part is configured to transmit the plurality of image processing programs to be selected, a process flow defining the execution order of the plurality of image processing programs, and the storage location information to the image processing device.

18. An information processing method for an information processing device configured to be communicable with an image processing device comprising a first storage part and an FPGA, the information processing method comprising:
- preparing a library comprising a plurality of image processing programs that are executable by the FPGA;
- providing a user interface configured to be able to receive a selection manipulation for selecting one or more of the plurality of image processing programs from the library and a designation manipulation for designating an execution order of the plurality of image processing programs to be selected by the selection manipulation;
- generating storage location information defining a storage location in the first storage part for each of the plurality of image processing programs to be selected; and
- transmitting the plurality of image processing programs to be selected, a process flow defining the execution order of the plurality of image processing programs, and the storage location information to the image processing device.

19. A non-transitory computer-readable medium storing an information processing program that is executed by an information processing device configured to be communicable with an image processing device comprising a first storage part and an FPGA, the information processing program causing the information processing device to perform:
- preparing a library comprising a plurality of image processing programs that are executable by the FPGA;
- providing a user interface configured to be able to receive a selection manipulation for selecting one or more of the plurality of image processing programs from the library and a designation manipulation for designating an execution order of the plurality of image processing programs to be selected by the selection manipulation;
- generating storage location information defining a storage location in the first storage part for each of the plurality of image processing programs to be selected; and
- transmitting the plurality of image processing programs to be selected, a process flow defining the execution order of the plurality of image processing programs, and the storage location information to the image processing device.

* * * * *